Feb. 21, 1967  E. KARHU  3,304,828
EXPANSION BOLT
Filed Sept. 18, 1964
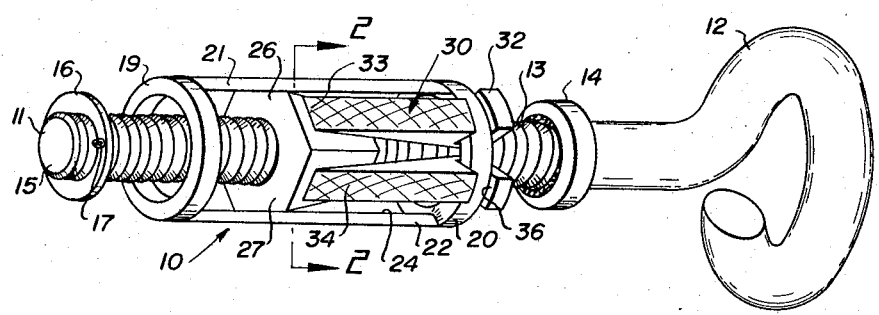
Fig. 1.
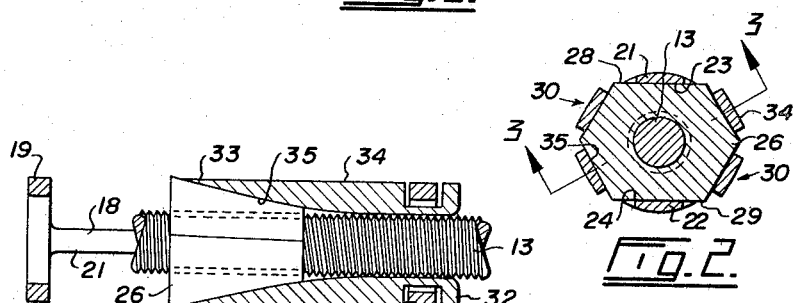
Fig. 2.
Fig. 3.
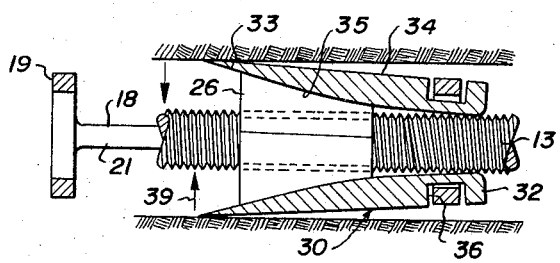
Fig. 4.
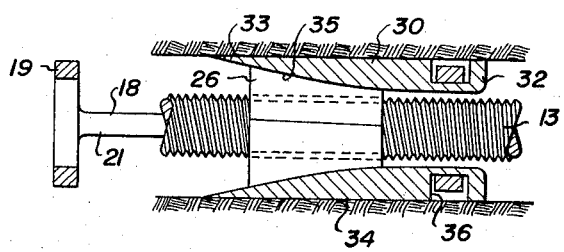
Fig. 5.
INVENTOR
ESKO KARHU
BY Featherstonhaugh & Co.
ATTORNEYS

United States Patent Office 3,304,828
Patented Feb. 21, 1967

3,304,828
EXPANSION BOLT
Esko Karhu, 426 E. 10th St., North Vancouver,
British Columbia, Canada
Filed Sept. 18, 1964, Ser. No. 397,548
3 Claims. (Cl. 85—66)

This invention relates to expansion bolts particularly of the type of bolt used as an anchoring device found in mines and the like, whereby drilling or cutting machines may be anchored to the walls and ceilings of tunnels. In the operation of drilling and cutting mining equipment, it is common practice to first drill a hole on the face or ceiling of a tunnel and insert therein an expansion bolt or the like which is anchored one way or another within the hole in order to provide means whereby the equipment may be held against the face to be drilled or cut.

In many instances, expansion bolts are driven into the walls and the heavier equipment secured thereto by cables or the like. However, in the main, such expansion bolts have required a great deal of labour to install and, once installed, many of them may not be withdrawn. Other expansion bolts of a screw-type are applied wherein a hole in the shaft is rotated to move a nut against or into engagement with gripping dogs or lugs, the latter moving outwardly against the wall of a hole to anchor the device therein. In the main, expansion bolts of this latter type, once set, are difficult to withdraw as the moving parts thereof are wont to separate. In other devices of this type, difficulties are encountered by reason of the fact that the rotation of the screw to move the dogs quite often results in movement of the dogs rotatably in the hole and thereby prevents the expansion bolt from operating.

The present invention overcomes the problems involving this latter type of expansion bolt by providing rock gripping dogs which are secured to the entire bolt assembly and which may be operated between a loose and a rock gripping position at will so that the dog may be removed from a hole after it has served its purpose. The present invention also provides a rock anchor so constructed, so that should its grip inadvertently be loosened, it will automatically reposition and tighten itself in the hole, thereby preventing its accidental withdrawal therefrom.

The present invention comprises an elongated casing, a threaded shaft extending axially through the casing and having shoulder means adjacent each end of the casing to limit longitudinal movement of the latter relative to the former, at least one pair of elongated hole gripping dogs each pivotally and slidably mounted adjacent one of their ends at one end of the casing and having their free ends extending towards the other end of the casing, an opening in the casing adjacent each dog to permit lateral and pivotal movement of the latter, an expanding member threadedly engaging the shaft for longitudinal movement therealong and having wedge-shaped dog engaging surfaces, means slidably to maintain the expanding member nonrotative relative to the casing whereby rotation of the shaft within the casing will permit an expanding member to move between the free ends of the dogs to swing them outwardly of the casing to a gripping position.

In the drawings which illustrate the apparatus,

FIGURE 1 is an isometric view of the apparatus,

FIGURE 2 is a section of the apparatus taken along line 2—2 of FIGURE 1,

FIGURE 3 is a longitudinal sectional view with a portion of the apparatus of FIGURE 1 showing the rock gripping dogs in a non-gripping position, FIGURE 4 is a view of the apparatus similar to FIGURE 3 showing the dogs in an initial engaging position, and FIGURE 5 is a view similar to FIGURE 3 showing the dogs in the fully engaged position.

Referring to the drawings, the expansion bolt, which is indicated generally by the numeral 10, comprises an elongated shaft 11 having a hooked outer portion 12 and an elongated inner threaded portion 13. The shaft is provided with an annular stop 14 welded or otherwise fastened thereto at the junction of the outer and inner portions 12 and 13 and has at the free end 15 of said inner portion a washer 16, the latter being maintained on the shaft by a cotter pin 17 extending transversely therethrough.

Loosely embracing the inner portion 13 of the shaft is a tubular casing 18, the latter taking the form of a pair of stiff collars 19 and 20 having a rectangular cross section maintained in spaced co-axial relationship by a pair of guide members 21 and 22 extending between the collars and disposed longitudinally of the shaft on diametrically opposite sides thereof, said guide members each having flat, smooth inner surfaces 23 and 24 respectively.

Threaded over the shaft 11 and lying between the collars 19 and 20 is a conically-shaped hexagonal nut 26, the base 27 thereof as measured between a pair of opposing sides 28 and 29 being adapted to slidably fit between the guide members 21 and 22 so that the inner surfaces 23 and 24 of the latter will prevent rotation of the nut 26 relative to the casing 18. The nut it directionally disposed on the shaft 11 so that its tapered end extends toward collar 20.

The expansion bolt, as in most expansion bolts, is provided with gripping dogs adapted to grip the walls of a drilled hole in a rock face. These dogs are indicated by the numeral 30 and are formed as elongated longitudinally extending wedge-shaped pieces having a thickened base portion 32 and a tip 33. The outer surfaces 34 of each of the dogs are roughened and their inner surfaces 35 are smooth and arcuately formed in a longitudinal direction. Each of the dogs has formed transversely across its outer surfaces 34 adjacent the base portion 32 thereof a groove 36, the latter being rectangularly shaped in cross sectional configuration, its dimensions being slightly larger than the cross sectional dimension of the collar 19. The depth of each of the grooves is such so as to permit the dogs to lie loosely interposed between shaft 11 and the collar 20 with said grooves thereof embracing said collar. The loose fit permits a certain amount of pivotal movement of the dogs around the collar 19 between a position, as shown in FIGURE 3, in which the outer surfaces 34 of each of them extends parallel to the shaft and a position, as shown in FIGURE 4, in which their outer surfaces lie angularly disposed to the longitudinal axis of the shaft 11, their tips 33 extending outwardly beyond the guide members 21 and 22. This pivotal movement of the dogs between the two last-mentioned positions is accomplished by means of bringing the nut 26 between their arcuately formed inner surfaces 35, in a manner to be described hereinafter, and is shown in FIGURES 3 and 4. The base portion 32 of each of the dogs normally lies against the shaft 11, the pivotal movement being around a point of contact therebetween, with the base 38 of each of the notches lying spaced inwardly of the collar 19. It will also be seen, by referring to FIGURE 4, that the arcuately shaped inner surfaces 35 of each of the dogs provide point contact of each with the nut 36 so that a force inwardly as indicated by the arrows 39 upon the tips 33 of each the dogs will tend to pivot them about the fulcrum provided by the said point of contact moving the base portions of the dogs outwardly away from the shaft into a position as shown by FIGURE 5 of the drawings in which the outer surfaces 34 of the dogs again lie parallel to the longitudinal axis of the shaft 11 but radially outwardly from the guide members 21 and 22. In this position, dependent upon the size of the drill hole relative to the size of the expansion bolt, it will be seen that the entire outer surface 34 of each of the dogs may be brought into contact with the walls of the hole to tightly grip the latter.

Preliminary to the insertion of the expansion bolt into a drill hole, the nut 26 is rotated by hand about the shaft 11 until, with the base portion 32 of the dogs lying against stop 14, said nut is positioned a sufficient distance outwardly beyond the tips 33 of the dogs that the latter lie loosely against the shaft 11 with the outer surfaces 34 extending parallel to the longitudinal axis of the latter. The assembly is then inserted, threaded in first, into a suitably sized drill hole with only the hooked outer portion 12 extending therefrom and the shaft rotated. The frictional grip of the dogs with the walls of the hole will maintain the casing 18 non-rotative relative thereto and with it the nut 26, thereby permitting the shaft to rotate in the nut and begin to draw the latter between the inner arcuate surfaces 35 of the dogs, moving their tips 33 outwardly until they come to contact with the walls of the hole. Continued rotation of the shaft will slidably draw the nut along said inner surfaces 35, pivotally moving the dogs about their tips and drawing their base portions 32 radially outwardly until the entire outer surfaces 34 of each of them make contact with the hole, thereby wedging the entire expansion bolt therein to prevent its withdrawal therefrom.

As has been described previously, the casing has a certain minimal amount of longitudinal play between the stop 14 and washer 16. It will be seen, therefore, that should the dogs not be sufficiently tightened against the walls of the hole, any strain outwardly against the hooked outer portion 12 occasioned by the pull of drilling or cutting equipment will move the nut further along the arcuately formed inner surfaces 35 of the dog, thereby moving the latter further outwardly against and thereby increasing their grip on the walls of the hole. It will also be seen that the heavier tthe pull against the hooked outer portion 12 of the expansion bolt the greater will be the grip of the dogs on the walls of the hole due to the wedging action of the nut against the said dogs.

Removal of the expansion bolt 10 from the hole is accomplished by simply reversing the above-mentioned procedure by counterrotating the shaft 11 to draw the nut 26 from between the inner surfaces 35 of the dogs 30, allowing the latter to fall away from the walls of the hole. The shaft 11 may then be slid outwardly to draw the washer 16 against collar 20 and the entire assembly extracted from the hole.

What I claim as my invention is:

1. An expansion bolt assembly comprising an elongated casing formed as a pair of spaced coaxially aligned collars and a pair of spaced parallel elongated rigid guide members extending between the collars, one of said collars being an outer collar and the other an inner collar, a pair of elongated gripping dogs arranged between the guide members, each of said dogs being connected at an end to the outer one of the collars for pivotal movement away from and towards the casing, a threaded shaft rotatably and slidably extending through the casing between the gripping dogs, a pair of stop members, larger than the holes in the collars through which the threaded shaft passes, secured to the latter in longitudinally spaced relationship externally of the ends of the casing, and an expanding nut threadedly engaged with the shaft and in longitudinal slidable engagement with the guide members for non-rotative longitudinal movement relative to the casing, whereby upon rotation of the shaft relative to the casing the nut is moved into and out of spreading engagement with the dogs.

2. An expansion bolt assembly comprising an elongated casing formed as a pair of spaced coaxially aligned collars and a pair of spaced parallel elongated rigid guide members extending between the collars, one of said collars being an outer collar and the other an inner collar, a pair of elongated gripping dogs arranged between the guide members at the outer one of the collars, each of said dogs having an outer gripping surface and a transversely extending groove formed in said outer surface adjacent an end thereof for receiving said outer collar, each of said grooves being sufficiently large to permit pivotal and lateral movement of the dogs associated therewith away from and towards the casing, a pair of stop members, larger than the holes in the collars through which the threaded shaft passes, secured to the latter in longitudinally spaced relationship externally of the ends of the casing, and an expanding nut threadedly engaged with the shaft and in longitudinal slidable engagement with the guide members for non-rotative longitudinal movement relative to the casing, whereby upon rotation of the shaft relative to the casing the nut is moved into and out of spreading engagement with the dogs.

3. An expansion bolt assembly as claimed in claim 2 in which the expanding nut is of longitudinally tapered aspect having longitudinally extending planar surfaces for slidably engaging the guide members and the gripping dogs.

References Cited by the Examiner

UNITED STATES PATENTS

| 927,064 | 7/1909 | Mower | 85—75 |
| 1,021,794 | 4/1912 | Pleister | 85—66 |
| 1,108,656 | 8/1914 | Adler | 85—75 |
| 1,790,841 | 2/1931 | Rosen | 85—75 |
| 2,431,069 | 11/1947 | Mitchell | 85—75 |
| 2,672,175 | 3/1954 | Howard | 85—75 |
| 2,870,666 | 1/1959 | Dempsey | 85—76 |
| 3,188,815 | 6/1965 | Schvermann et al. | 85—76 |
| 3,247,754 | 4/1966 | Bieser | 85—73 |

FOREIGN PATENTS 1,197,234    6/1959    France.

CARL W. TOMLIN, *Primary Examiner.*

EDWARD C. ALLEN, *Examiner.*

M. PARSONS, JR., *Assistant Examiner.*